Patented Dec. 15, 1953

2,662,857

UNITED STATES PATENT OFFICE 2,662,857

PICKLING BATH AGENT

James W. Carroll, Philadelphia, Pa., assignor to The Pennsylvania Salt Manufacturing Company, Philadelphia, Pa., a corporation of Pennsylvania No Drawing. Application March 26, 1948,
Serial No. 17,369

8 Claims. (Cl. 252—147)

This invention relates to improved compositions and processes for pickling.

Metal pickling baths consisting principally of aqueous solutions of mineral acids to dissolve scale and other impurities from metal objects, have been improved heretofore by addition of such agents as corrosion inhibitors and foaming agents. The corrosion inhibitors which may, for example, be urea-aldehyde condensation products, aromatic derivatives of thiourea, or other substances taught in the art to inhibit attack of the pickling acid on the free metal, are usually compounded with a number of other ingredients to improve their inhibiting action. Ingredients often included in the inhibitor formulation include animal glue (i. e. gelatin), starch and flour.

In order to provide a film of foam on top of the pickling bath and reduce acid spraying, it is also common to add a foaming agent to pickling baths. Such materials as cellulose pulp waste liquor, starch, flour, clays and the like have been suggested for this purpose, and in a copending application the present applicant describes a new foaming agent comprising a mixture of a sodium or other lignin sulfonate and a clay such as bentonite.

It has often been noted, heretofore, when employing both an inhibitor formulation and a foaming agent that it may require from 30 to 60 minutes for the foaming agent to produce an effective foam, whereas in the absence of the inhibitor a good foam may be produced in less than 5 minutes. It has not heretofore been known why the inhibitor often so greatly retards the appearance of the desired foam.

I have now found that this delayed action can be traced to the organic colloid-forming material, i. e. glue (or other gelatin), starch or flour, generally present in inhibitor formulations, and that as little as 0.003% of such colloid-forming material, based on the weight of the bath, is sufficient to retard foam formation by 30 to 60 minutes. I have further found that this delay in foam formation may be greatly reduced or eliminated by the incorporation in the bath of a small amount of a surface active agent which may be defined as a cationic wetting agent containing sufficient hydrophilic alkanol groups to make the agent water-soluble or water-dispersible at a concentration in water of 0.1% by weight.

My preferred agent is a cationic wetting agent containing, in the cation, at least one basic nitrogen atom, at least one aliphatic group containing at least 10 carbon atoms, and sufficient hydroxy-ethyl groups to make the agent water-soluble or water-dispersible at a concentration in water of 0.1% by weight, for example the wetting agent known as "Aerosol C-61" which is probably a mixture of compounds of the general formula:

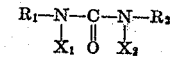

in which $R_1$ and $R_2$ are aliphatic groups containing at least 10 carbon atoms; and $X_1$ and $X_2$ are hydrophilic alkanol groups, or one of the commercial wetting agents "Amine O," "Amine S" or "Amine C," each of which is a substituted imidazoline containing as nuclear substituents both an aliphatic hydrocarbon group of more than 10 carbon atoms and a hydrophilic alkanol group. The term "water-dispersible," as herein used, means that when the agent is shaken up with water it forms a dispersion that does not separate upon standing. The term "at least water-dispersible" as used in the claims is intended to denote that the agent is either completely water-soluble or at least can be dispersed in water as defined in the preceding sentence.

As little as .00025% of such an agent, based on the weight of the pickling bath, is sufficient substantially to eliminate the foam retarding action of a colloid-former present in substantial amount in the bath, and as little as .00005% of my agent, based on the weight of the bath, may be effective to cause a marked reduction in the delay of foam formation due to a colloid-former as above described.

The ability to inhibit this delay in foam production is unique to the particular type of surface active agent above described. It has been found that all the other commercially available types of surface active agents, with which the present applicant has experimented, not only do not reduce the delay in foam formation, but greatly prolong the delay, or else prevent foaming altogether. Examples of such surface active materials, not suitable as foam retardation inhibitors in accordance with this invention, include the familiar anionic and non-ionic agents such as the long chain alkyl aryl sulfonate type wetting agents, the sulfonated soybean oils, sulfonated oleic acid esters, the long chain alkyl sulfates, the polyether alcohols, and the hydrolyzed protein types of wetting agents; also the cationic types of surface active agents which do not contain sufficient hydrophilic groups, such as the usual quaternary amonium compounds sold as surface active agents.

The class of compounds suitable as inhibitors of foam retardation in accordance with this invention includes, among others, the following specific examples:

(a) 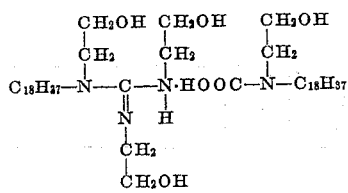

(b) 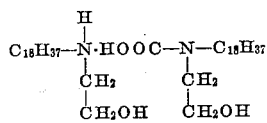

(c) 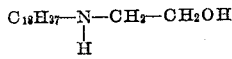

(d) 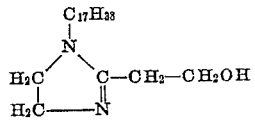

(e) 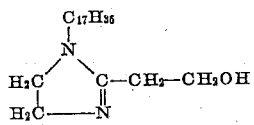

(f) 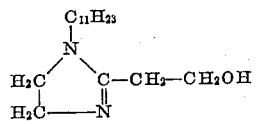

The agent may be added separately to the pickling bath or may be incorporated either in the inhibitor formulation or the foamer formulation. In applicant's copending application Serial No. 17,370, now Patent No. 2,614,081, of October 14, 1952, entitled "Pickling Bath Foaming Agent," filed the same day as this application, a foaming agent is described which may contain 50% bentonite, 48% sodium lignin sulfonate and 2% Aerosol C-61.

When the foam retardation inhibitor of this invention is included in the foaming agent formulation, the amount of the foam retardation inhibitor added may be as little as 1% or less of the total foaming agent formulation. Any larger amount may be used, but it is preferred for reasons of economy not to exceed about 2%. Approximately the same proportion of my foam retardation inhibitor may be included in a corrosion inhibitor formulation, or in other compositions which are prepared for control of pickling bath action, such as mixtures of foamers and inhibitors, which are called foaming inhibitors.

The following examples are illustrative of my invention:

*Example 1.*—A bath of aqueous sulfuric acid of 10% concentration was prepared for the pickling of high carbon steel at 80° C. In one test 0.025%, based on the weight of the bath, of a foaming agent consisting of about 50% Volclay bentonite and 50% sodium lignin sulfonate was added to the bath containing pieces of the steel. A good foam formed under the bath conditions described in about 1 minute. In a comparative test the same amount of the same foaming agent was added and .025%, based on the weight of the bath, of a corrosion inhibitor composition was also added. The principal ingredient in the corrosion inhibitor composition was a urea-aldehyde condensation product, and the composition also contained 19% glue as described for example in copending application Serial No. 645,235 filed on February 2, 1946, now abandoned. Thus the bath contained about .005% glue. In this case it required 30 minutes for a good foam to appear. A second comparative test was then made in which the same amount of the same corrosion inhibitor composition was added to a bath operating under the same conditions (i. e. .025% of the composition or about .005% of glue in the bath), and in this case there was added, along with .025% of the same foaming agent, .00025% of "Aerosol C-61," in which the effective ingredient or ingredients is believed to be one or more of the compounds (a), (b) or (c) listed in column 3. In this case it required only one minute for a good foam film to appear. Thus, the presence of .00025% of "Aerosol C-61" completely eliminated the 29 minute delay in foam formation caused by the presence of .005% glue.

To show the effect of glue content of the pickling bath on the retardation of initial foam formation, a similar sulfuric acid pickling bath was prepared and .025% of the above described foamer composition consisting of half bentonite and half sodium lignin sulfonate, was added to each of a number of successive samples of the bath containing pieces of high-carbon steel and held at 80° C. A urea-aldehyde corrosion inhibitor composition containing various percentages of glue was also added in .025% concentration to each of these various samples of the bath. The following table shows the time needed for good foam formation:

| Percent Glue in Bath | Time Required for Good Foam (Minutes) |
|---|---|
| 0 | 1 |
| .0005 | 1 |
| .0015 | 1 |
| .0025 | 5 |
| .0035 | 10 |
| .00425 | 20 |

Starch, gluten or materials containing such colloid-forming substances show a similar effect.

*Example 2.*—To show the unique effect of the agents of my invention in inhibiting this retardation of foam appearance, similar 10% sulfuric acid pickling baths were prepared, in each of which a glue-containing corrosion inhibitor was incorporated so as to have about .005% of glue present. Also .025% (or thereabouts) of the foaming agent, consisting of about half bentonite and half sodium lignin sulfonate was incorporated in each bath. Pieces of high carbon steel were present and the temperature was 80° C. In the absence of any further agent as called for by this invention, the time required for good foam formation would have been 30 minutes. The following tabulation shows the time required for good foam formation when the indicated amount of various additional agents were incorporated in the bath:

A.—Agents outside the scope of my invention:

| Agent | Time Required for Good Foam (Minutes) |
|---|---|
| 0.001% Nacconol NR [1] | No foam. |
| 0.001% Igepon AP Extra [2] | Do. |
| 0.001% Unitexol FS [3] | Do. |
| 0.001% Duponol ME [4] | Do. |
| 0.001% Alrosene PD [5] | Do. |
| 0.005% Merlin F [6] | 70. |
| 0.025% Lignone | 30. |
| 0.025% Blackstrap Molasses | 20. |
| 0.025% Chestnut Extract | 30. |
| 0.00025% Cationic Agent D [7] | 30. |
| 0.00025% Armac HT [8] | 30. |
| 0.00025% Triton K-60 [9] | 30. |
| 0.00025% Alkaterge C [10] | 30. |

[1] Nacconol NR is an alkyl benzene sodium sulfonate, the alkyl groups corresponding to kerosene hydrocarbons.
[2] Igepon AP Extra is a sulfonated oleic acid ester.
[3] Unitexol FS is a sulfonated soybean oil.
[4] Duponol ME is a long chain alkyl sulfate.
[5] Alrosene PD is a modified long chain alcohol sulfate.
[6] Merlin F is a hydrolyzed protein.
[7] Cationic Agent D is

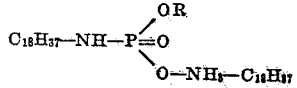

in which R is a hydrophilic group.
[8] Armac HT is

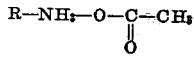

in which R contains 16 to 18 carbon atoms.
[9] Triton K-60 is

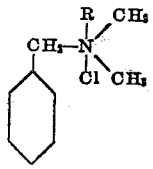

[10] Alkaterge C is

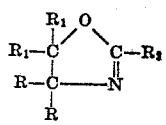

in which R is methyl; $R^1$ is usually H; and $R^2$ may be methyl, phenyl or long chain alkyl.

B.—Agents within the scope of my invention:

| Agent | Time required for good foam (minutes) |
|---|---|
| 0.0025% Aerosol C-61 [1] | 1 |
| 0.00125% Aerosol C-61 | 1 |
| 0.00075% Aerosol C-61 | 1 |
| 0.00025% Aerosol C-61 | 1 |
| 0.00025% Amine—O [2] | 1 |
| 0.00025% Amine—S [3] | 3 |
| 0.00025% Amine—C [4] | 1 |

[1] Aerosol C-61 is believed to be a mixture of

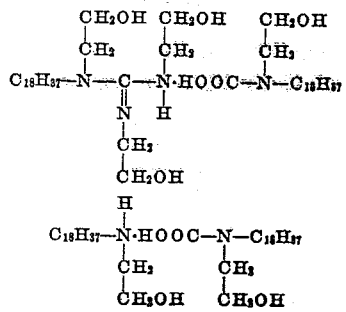

and

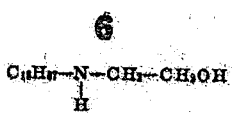

[2] Amine—O is

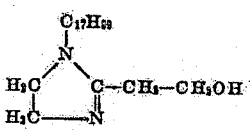

[3] Amine—S is

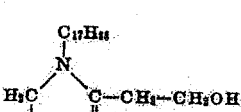

[4] Amine—C is

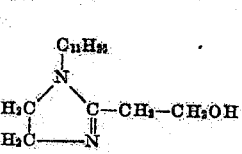

It will be noted that the above compounds contain from one to four basic nitrogen atoms, from one to two aliphatic groups ranging up to 18 carbon atoms, and from one to four hydroxy-ethyl groups.

Example 3.—In a series of tests the same procedure as in the first paragraph of Example 1 was followed, the composition and proportions of all addition agents were the same, but the composition and temperature of the initial pickling acid was varied as follows:

(a) 10% HF was employed at 60° C.
(b) 15% HCl was employed at 60° C.
(c) 10% $H_3PO_4$ was employed at 80° C.

In each test in which no "Aerosol C-61" was added, it required about a half hour for foam to appear. When Aerosol C-61 was included as described in Example 1, foam appeared in each test within a minute.

Example 4.—Retardation of foam appearance after addition of foaming agent, as in Examples 1, 2 or 3, is exhibited when starch or flour is present rather than glue, or when glue, starch or flour is present in the pickling bath without the other corrosion inhibitor ingredients, and, moreover, the delay in foam appearance similarly occurs in the case of other foaming agents such as sulfite pulp waste liquor, saponin, chestnut extract, or clay, when any form of a colloid-forming material such as gelatin, starch or gluten is present to the extent of .003% or more. In every such case this retardation in foam appearance has been found to be substantially eliminated, i. e. reduced to a minute or less, by incorporating in the bath at least 0.00025% of "Aerosol C-61" or equivalent surface active agent as above described. Foaming agents as above described are sold commercially as "No Gas," "Rodine Foaming Compound No. 8," and "Goulac."

Since many modifications in the compositions and method of my invention as described above are possible without departure from the scope of the invention, it is intended that the above description of my invention should be interpreted as illustrative, and the invention is not to be limited except as set forth in the claims which follow.

I claim:

1. A method of reducing the delay in foam formation upon addition of a foaming agent to a non-oxidizing mineral acid pickling bath that contains at least .003% of a foam-delaying organic colloid selected from the group consisting of gelatin, starch and gluten, based on the weight of the bath, that comprises incorporating in the bath at least .00025%, based on the weight of the pickling bath, of a cationic wetting agent containing, in the cation, from one to four basic nitrogen atoms, from one to two aliphatic groups containing from 10 to 18 carbon atoms, and from one to four hydroxy-ethyl groups, said agent being at least water-dispersible at a concentration in water of 0.1% by weight.

2. A metal pickling bath comprising an aqueous solution of a non-oxidizing mineral acid, a foam-delaying organic colloid selected from the group consisting of gelatin, starch and gluten, in the amount of at least .003% based on the weight of the bath, a foam forming agent, and at least 0.00025%, based on the weight of the pickling bath, of a cationic wetting agent containing, in the cation, from one to four nitrogen atoms, from one to two aliphatic groups containing from 10 to 18 carbon atoms and from one to four hydroxy-ethyl groups, said last-named agent being at least water-dispersible at a concentration in water of 0.1% by weight.

3. A metal pickling bath comprising an aqueous solution of a non-oxidizing mineral acid, an agent to inhibit corrosion of metal in the bath, a foam-delaying colloid selected from the group consisting of gelatin, gluten and starch, in the amount of at least .003% based on the weight of the bath, a foam forming agent, and at least .00025%, based on the weight of the pickling bath, of a cationic wetting agent containing, in the cation, from one to four basic nitrogen atoms, from one to two aliphatic groups containing from 10 to 18 carbon atoms, and from one to four hydroxy-ethyl groups, said last-named agent being at least water-dispersible at a concentration in water of 0.1% by weight.

4. A metal pickling bath comprising an aqueous solution of sulfuric acid, an agent to inhibit corrosion of metal in the bath, gelatin in the amount of at least .003% based on the weight of the bath, a foam-forming agent in which clay and a lignin sulfonate selected from the group consisting of alkali metal and alkaline earth metal lignin sulfonates are the predominant ingredients and at least .00025%, based on the weight of the pickling bath, of a cationic wetting agent containing, in the cation, from one to four basic nitrogen atoms, from one to two aliphatic groups containing from 10 to 18 carbon atoms, and from one to four hydroxy-ethyl groups, said last-named agent being at least water-dispersible at a concentration in water of 0.1% by weight.

5. A composition for incorporation in a non-oxidizing mineral acid pickling bath which in operation contains at least .003% of a foam-delaying organic colloid selected from the group consisting of gelatin, starch and gluten, based on the weight of the bath, said composition comprising a foaming agent, and at least 1% of a cationic wetting agent containing, in the cation, from one to four basic nitrogen atoms, from one to two aliphatic groups containing from 10 to 18 carbon atoms and from one to four hydroxy-ethyl groups, said last-named agent being at least water-dispersible at a concentration in water of 0.1% by weight.

6. A composition for incorporation in a non-oxidizing mineral acid pickling bath which in operation contains at least .003%, based on the weight of the bath, of a foam-delaying colloid selected from the group consisting of gelatin, starch and gluten, said composition comprising a foaming agent and at least 1% of the surface active material characterized by the chemical structure selected from the group consisting of

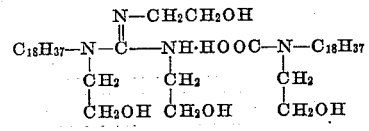

and

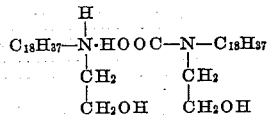

7. A composition for incorporation in a non-oxidizing mineral acid pickling bath which in operation contains at least .003%, based on the weight of the bath, of a foam-delaying colloid selected from the group consisting of gelatin, starch and gluten, said composition comprising a foaming agent and at least 1% of the surface active material characterized by the chemical structure selected from the group consisting of

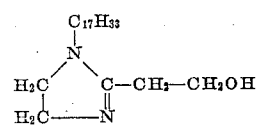

and

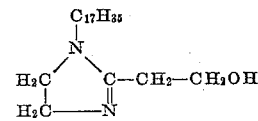

and

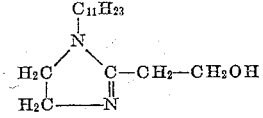

8. A composition for incorporation in a non-oxidizing mineral acid pickling bath which in operation contains at least .003% of a foam-delaying organic colloid selected from the group consisting of gelatin, starch and gluten, based on the weight of the bath, said composition comprising a foaming agent, a metal corrosion inhibitor and at least 1% of a cationic wetting agent containing, in the cation, from one to four basic nitrogen atoms, from one to two aliphatic groups containing from 10 to 18 carbon atoms, and from one to four hydroxy-ethyl groups, said agent being at least water-dispersible at a concentration in water of 0.1% by weight.

JAMES W. CARROLL.

References Cited in the file of this patent

UNITED STATES PATENTS

| Number | Name | Date |
| --- | --- | --- |
| 1,736,118 | Gravell | Nov. 19, 1929 |
| 1,852,648 | Gravell | Apr. 5, 1932 |
| 2,203,649 | Felkers | June 4, 1940 |
| 2,267,965 | Wilson | Dec. 30, 1941 |